United States Patent
Hu et al.

(10) Patent No.: US 12,182,128 B2
(45) Date of Patent: Dec. 31, 2024

(54) SYSTEMS AND METHODS FOR COMPRESSING DATA FOR DISTRIBUTED LEDGERS

(71) Applicant: WALMART APOLLO, LLC, Bentonville, AR (US)

(72) Inventors: Lingyun Hu, Brooklyn, NY (US); Anand Banik, Rogers, AR (US); Pushparaj Parab, Bentonville, AR (US); Haritha Gunawardana, Piscataway, NJ (US); Travis B. Folck, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 18/151,969

(22) Filed: Jan. 9, 2023

(65) Prior Publication Data
US 2024/0232204 A1    Jul. 11, 2024

(51) Int. Cl.
G06F 17/00    (2019.01)
G06F 16/22    (2019.01)
(Continued)

(52) U.S. Cl.
CPC ...... G06F 16/24561 (2019.01); G06F 16/221 (2019.01); G06F 16/258 (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,965,897 B1 * 11/2005 Chen ............... H03M 7/30
                                              707/999.102
10,466,111 B2   11/2019 Jones
(Continued)

FOREIGN PATENT DOCUMENTS

WO    2021200905 A1    10/2021
WO    2022133330 A1     6/2022

OTHER PUBLICATIONS

IBM; "IoT for blockchain supply chain solution architecture"; <https://www.ibm.com/cloud/architecture/architectures/iot-blockchain-cold-chain/>; May 7, 2021; pp. 1-19; retrieved from Internet Archive Wayback Machine <http://web.archive.org/web/20210101000000*/https://www.ibm.com/cloud/architecture/architectures/iot-blockchain-cold-chain/> on Apr. 11, 2023.

(Continued)

*Primary Examiner* — Hung D Le
(74) *Attorney, Agent, or Firm* — Fitch, Even, Tabin & Flannery LLP

(57) ABSTRACT

System and methods for compressing data for use in a distributed ledger are provided. In one form, the system includes: a network interface; a user interface device; and a control circuit coupled to the network interface and the user interface device. In this form, the control circuit executes a data compression module configured to: receive, via the network interface, a data set; transform and store the data set into a file format of rows and columns in which data of the data set are stored in a columnar fashion; apply a first compression step to compress each row and write each compressed row into the file format; apply a second compression step to further compress data after the compressed rows have been written into the file format; and encode the compressed data and transmit the encoded data to a first node of a distributed ledger.

20 Claims, 9 Drawing Sheets

(51) Int. Cl.
  *G06F 16/2455*   (2019.01)
  *G06F 16/25*     (2019.01)

(56) References Cited

U.S. PATENT DOCUMENTS

| | | | | |
|---|---|---|---|---|
| 11,062,042 | B1 | 7/2021 | McKervey | |
| 11,489,679 | B2 | 11/2022 | Soundararajan | |
| 11,818,207 | B1* | 11/2023 | Paczkowski | H04L 65/70 |
| 2003/0235392 | A1* | 12/2003 | Boston | H04N 21/4147 |
| | | | | 386/328 |
| 2004/0054858 | A1* | 3/2004 | Chandrasekaran | G06F 3/0608 |
| | | | | 707/E17.005 |
| 2018/0046766 | A1* | 2/2018 | Deonarine | G06F 21/6209 |
| 2018/0218027 | A1* | 8/2018 | Cronie | H04L 9/32 |
| 2019/0288847 | A1* | 9/2019 | Beckmann | H04L 9/3239 |
| 2020/0137090 | A1* | 4/2020 | Holzhauer | H04L 63/1416 |
| 2020/0175002 | A1* | 6/2020 | Cheng | G06F 16/2379 |
| 2020/0204349 | A1* | 6/2020 | Sardesai | H04L 9/0637 |
| 2020/0204378 | A1* | 6/2020 | Yang | H04L 63/123 |
| 2020/0212932 | A1* | 7/2020 | Bier | H04L 9/0637 |
| 2020/0295942 | A1* | 9/2020 | Bartolucci | H04L 9/0891 |
| 2020/0374106 | A1* | 11/2020 | Padmanabhan | H04L 63/105 |
| 2021/0132869 | A1 | 5/2021 | Tian | |
| 2021/0141909 | A1* | 5/2021 | Zhai | G06F 16/9024 |
| 2021/0365407 | A1 | 11/2021 | Okutubo | |
| 2022/0109455 | A1* | 4/2022 | Barry | H04L 9/3239 |
| 2022/0150050 | A1* | 5/2022 | Gundavelli | H04L 63/123 |
| 2022/0253731 | A1* | 8/2022 | Miller | G06F 16/2237 |
| 2022/0278859 | A1* | 9/2022 | Mackay | H04L 9/0643 |
| 2023/0179424 | A1* | 6/2023 | McNamee | H04L 9/3239 |
| | | | | 713/193 |
| 2023/0418788 | A1* | 12/2023 | Schumacher | H04L 9/50 |

OTHER PUBLICATIONS

Nakamoto, Satoshi; "Bitcoin: A Peer-to-Peer Electronic Cash System"; <extension://elhekieabhbkpmcefcoobjddigjcaadp/https://bitcoin.org/bitcoin.pdf>; Sep. 6, 2015; pp. 1-9; retrieved from Internet Archive Wayback Machine <http://web.archive.org/web/20150101000000*/https://bitcoin.org/en/bitcoin-paper> on Apr. 11, 2023.

IBM; "Enable Snappy Compression for Improved Performance in Big SQL and Hive—Hadoop Dev"; <https://www.ibm.com/support/pages/enable-snappy-compression-improved-performance-big-sql-and-hive-hadoop-dev#:~:text=Starting%20with%20Hive%200.13%2C%20the%20%E2%80%98PARQUET.COMPRESS%E2%80%99%3D%E2%80%99SNAPPY%E2%80%99%20table%20property,Hive%20always%20compresses%20any%20Parquet%20file%20it%20produces.>; Nov. 21, 2020; pp. 1-3; retrieved from Internet Archive Wayback Machine <http://web.archive.org/web/20200101000000*/https://documentcloud.adobe.com/spodintegration/index.html?locale=en-us> on Apr. 11, 2023.

Levy, Eran; What is the Parquet File Format? Use Cases & Benefits; <https://www.upsolver.com/blog/apache-parquet-why-use>; Feb. 27, 2022; pp. 1-14.

Axlund et al.; "Study' of bug detection tools on Ethereum smart contracts", Aug. 28, 2023 ;<https://lup.lub.lu.se/luur/download?func=downloadFile&recordOId=9138646&fileOId=913864 7>.

Khan, Samiya et al.; "Storage Solutions for Big Data Systems: A Qualitative Study and Comparison"; <https://arxiv.org/ftp/arxiv/papers/1904/1904.11498.pdf>; retrieved from online Mar. 30, 2024.

PCT; App. No. PCT/US2024/10260; International Search Report and Written Opinion mailed Jun. 10, 2024; (13 pages).

* cited by examiner

SYSTEMS AND METHODS FOR COMPRESSING DATA FOR DISTRIBUTED LEDGERS

TECHNICAL FIELD

This invention relates generally to compression of large data sets, and more particularly, to compression of data for use in distributed ledgers.

BACKGROUND

Distributed ledgers have become more commonly used to securely share information between entities. Use of distributed ledgers have provided both security and indica of trustworthiness regarding the source of and changes in data. However, one issue with distributed ledges arises when sharing large data sets. In that instance, distributed ledgers may not be capable of storing and transmitting large data sets.

One area where it would be useful to be able to store and transmit large data sets is between entities in a supply chain. Transport of goods often involves a purchaser of goods, a supplier of the goods, and/or a carrier of the goods, and during transport, events may occur that result in a change in transportation conditions. For example, perishable items being transported may not be maintained at required temperatures for the entire duration of the transport. This change in transportation conditions may support submission of a claim by the purchaser, some form of dispute resolution/elimination, and/or a modification of the charges between the purchaser and the carrier. In this instance, it is desirable for the purchaser to be able to share large data sets with the carrier on a distributed ledger to support the claim.

BRIEF DESCRIPTION OF THE DRAWINGS

Disclosed herein are embodiments of systems and methods for providing automatic invoice adjustment. This description includes drawings, wherein.

Figure 1:
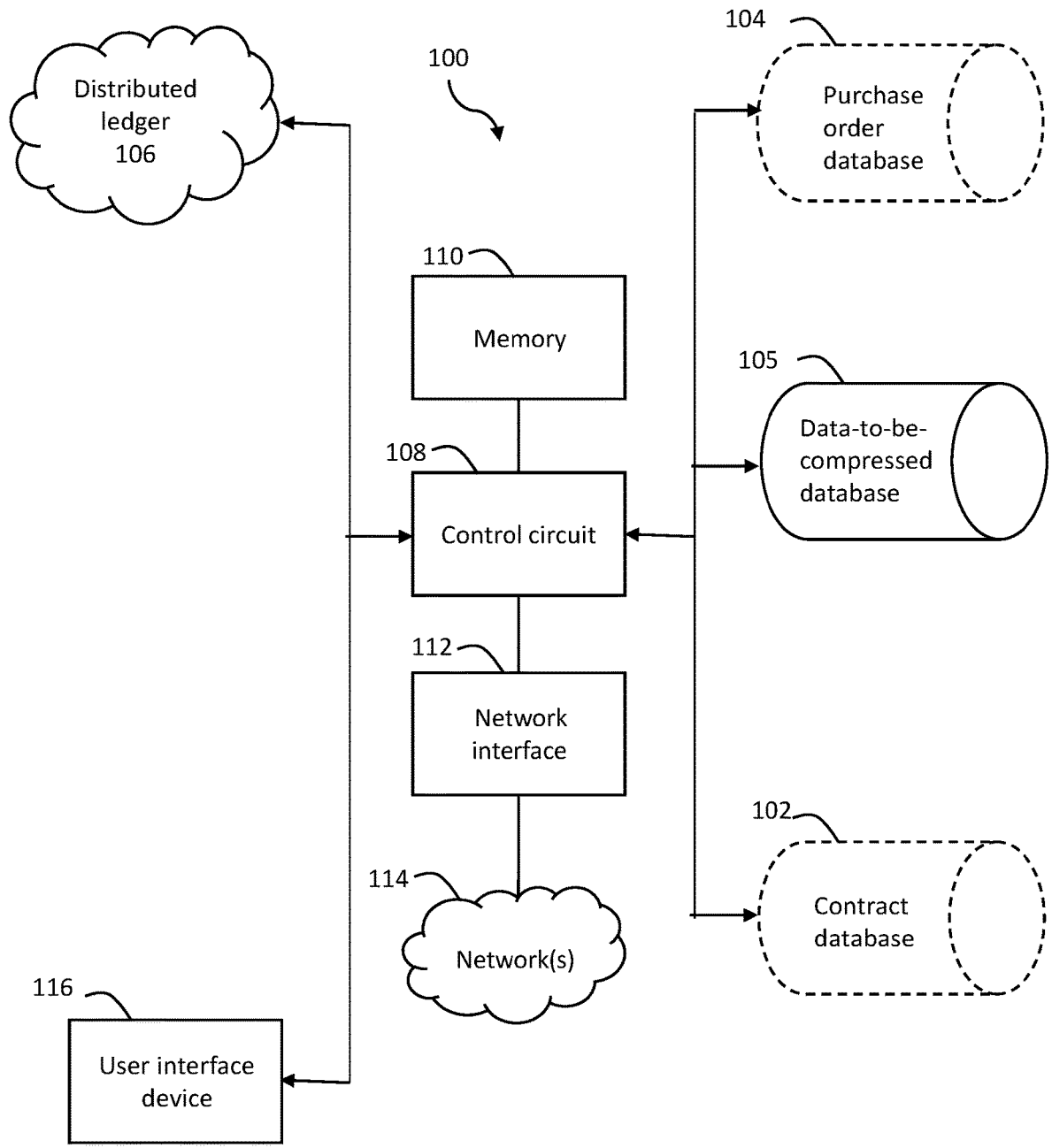
FIG. 1 comprises a block diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for compressing data for use in a distributed ledger. In one form, the system includes: a network interface; a user interface device; and a control circuit coupled to the network interface and the user interface device. In the system, the control circuit executes a data compression module configured to: receive, via the network interface, a data set; transform and store the data set into a file format of rows and columns in which data of the data set are stored in a columnar fashion; apply a first compression step to compress each row and write each compressed row into the file format; apply a second compression step to further compress data after the compressed rows have been written into the file format; and encode the compressed data and transmit the encoded data to a first node of a distributed ledger.

In some implementations, in the system, the data set comprises a temporal series of measurements. In some implementations, the control circuit is configured to transform and store the data of the data set in a parquet file format. In some implementations, the control circuit is configured to use a Snappy compression algorithm in the first compression step to compress each row and write each compressed row into the parquet file format. In some implementations, the control circuit is configured to use a gzip algorithm in the second compression step to further compress data in the parquet file format. In some implementations, the control circuit is configured to encode the compressed data by creating a base64 string encoding of the data in the parquet file format. In some implementations, the control circuit is configured to share the encoded data, via the first node of the distributed ledger and the network interface, with a second node of the distributed ledger, the first and second nodes corresponding to a first entity and a second entity, respectively. In some implementations, the control circuit is configured to: decode the encoded data into the file format in which the data are stored in a columnar fashion; apply a first decompression step to unzip the decoded data; and apply a second decompression step to transform the unzipped data to correspond to the received data set. In some implementations, the first entity is a purchaser of products and the second entity is a carrier of the products. In some implementations, the control circuit is configured to: compare data in the data set to a predetermined threshold corresponding to a characteristic of products transported by the carrier on behalf of the purchaser; determine that at least a portion of the data exceeds the predetermined threshold; and transmit a claim communication from the first entity to the second entity regarding the products transported by the carrier.

In another form, there is provided a method for compressing data for use in a distributed ledger, the method comprising: receiving, by a control circuit executing a data compression module, a data set via a network interface; transforming and storing, by the control circuit, the data set into a file format of rows and columns in which data of the data set are stored in a columnar fashion; applying, by the control circuit, a first compression step to compress each row and write each compressed row into the file format; applying, by the control circuit, a second compression step to further compress data after the compressed rows have been written into the file format; and encoding, by the control circuit, the compressed data and transmitting the encoded data to a first node of a distributed ledger.

As an overview, and without limitation, this disclosure is directed generally to data shared via a distributed ledger/blockchain. As one example, distributed ledgers/blockchain may be used in the context of goods purchased from a supplier and shipped by a carrier. A blockchain is a digital record of a transaction that is distributed (records are shared with network participants) and secured using cryptographic technologies. Transaction events may be captured in-real-time and broadcast to blockchain network entities. The transaction data may be stored as a copy by each participant. This allows every node on the network to have real-time shared visibility to all transaction events and enables data integrity where it is challenging for one organization to gain control and change historical data on the network, thereby eliminating disputes. A blockchain is managed by each company's software, or node, on a peer-to-peer basis without the need for the intermediaries who traditionally authenticate transactions (such as banks or customs brokers).

One issue, however, that arises with blockchain is the storage of large data sets. One example illustrating this issue arises in the context of a supply chain involving a purchaser of goods, a supplier of the goods, and a carrier of the goods in which the carrier transports perishable goods that the must be maintained below a certain temperature threshold. Claims may arise where the perishable goods are not maintained at the requisite temperature. Currently, millions of dollars in annual temperature claims may be incurred that may require months to resolve between purchaser, supplier, and carrier transportation partners. Proof supporting a claim (and/or some form of dispute resolution/elimination) may be in the form of large data sets of a series of temperature measurements. These large data sets may be too large to be easily stored and shared on blockchain.

Thus, an issue in blockchain arises when sharing large data sets between entities. Blockchain is generally not capable of storing and transmitting large data sets. For example, blockchain may be used in the claims area in which claims are filed involving purchasers, suppliers, and carriers. The purchaser needs to submit evidence/proof supporting a claim, such as, for example, in the context of temperature issues. It is therefore desirable to decompress large data sets into a form that is suitable for blockchain. In some forms, a large data set that may be several megabytes in size can be compressed to a file that is less than one megabyte. The above supply chain example is just one example, and it should be evident that there are many other situations where it would be desirable to compress data for storage and transmission via blockchain.

Referring to FIG. 1, there is shown a block diagram showing a system 100 for compressing data for use in a distributed ledger. It is generally contemplated that the distributed ledger generally includes nodes for a purchaser of goods and for a carrier of goods. In one form, the data may relate to transport/carrier events that result in changes in transportation charges or that support claims relating to transport (and/or some form of dispute resolution/elimination). In some forms, it is also contemplated that the distributed ledger may include a node corresponding to a supplier of the goods.

The system 100 may optionally include a contract database 102 that includes a contract of the purchaser that involves the carrier. In other words, the purchaser has contracted with a carrier (or transportation company) to transport/ship the goods. In one form, the purchaser may be a retailer of merchandise. It is generally contemplated that the carrier contract may include various terms and information relating to the transport/shipment, such as, for example, origin of the shipment, destination, container type, a standard carrier alpha code (SCAC) used to identify the carrier, base rate/price, etc.

The system 100 may also optionally include a purchase order database 104 that includes a purchaser order between the purchaser and the supplier. In other words, the purchaser has placed a purchase order with a supplier for the purchase of the supplier's goods. It is generally contemplated that the purchase order may include various terms and information relating to the purchase, such as, for example, product name, product quantity, product price, product identifier, etc. It should also be understood that these contract and purchase order databases 102 and 104 may be part of a single, unitary database or may be part of more comprehensive databases.

The system 100 includes a database 105 of a large data set that needs to be compressed for use in the distributed ledger. In some forms, it is contemplated that the large data set relates to the transport of goods by the carrier. For example, the large data set may include a time/temporal series of measurements, such as, for instance, temperature measurements of different containers holding perishable merchandise items that must be maintained below a certain temperature threshold. The temperature measurements may be taken at regular interval such as every hour. Depending on various factors, such as the number of containers, the length of the transport, the time interval between measurements, it is contemplated that the measurements may result in a large data set. Again, this database 105 may be a separate database or may be part of a more comprehensive database that includes one or both databases 102 and 104.

It should be understood that the above example is just one example where large data sets may be generated. In the context of the transport goods, there are many other circumstances that may result in the generation of large data sets. For example, it is contemplated that this approach may be used in the context of forecasting, tracking and tracing transported items, and item sales trends. In addition, outside of the particular context of transport of goods, there are also many instances where large data sets are generated that are to be stored on a blockchain for sharing between entities. This disclosure is not intended to be limited to the example of data in the form of temperature measurements created during the transport of goods. It is also not intended to be limited to sharing between a purchaser of goods and a carrier of the goods.

The system 100 further includes a distributed ledger 106. The distributed ledger 106 comprises a distributed database comprising a plurality of nodes. In some forms, without limitation, the distributed ledger 106 comprises a plurality of records relating to one or more transactions involving a purchaser, a carrier, and/or a supplier, such as, for example, purchase order(s), carrier contract(s), and invoice(s). It may also be more comprehensive and involve additional entities. For example, in some forms, the distributed ledger 106 comprises a plurality of transaction records recording transfers of physical items and/or services between two or more entities of a supply chain (e.g., farm, supplier, manufacturer, transportation service provider, whole seller, retailer, etc.). In some embodiments, a transaction record may include an entities identifier (e.g., farm region, processor name and location, supplier name and location, distribution identifier, and store identifier), a transfer date, a transfer location, and characteristics of the transferred product or service (e.g., origin, ingredients). In some embodiments, the transaction record may include references to one or more other transaction records, recording, for example, a prior transfer of the product.

In some forms, the distributed ledger 106 may comprise a cryptographically verifiable ledger managed by a peer-to-peer network. In some forms, the distributed ledger 106 may comprise a blockchain database collectively verified and updated by computer systems associated with any number of entities in the supply chain functioning as nodes of the blockchain. For example, the blockchain may be updated and/or verified by retail stores, transporters, warehouses, distribution centers, suppliers, processors, manufacturers, farms, etc. In some embodiments, entities of the supply chain may add transaction records to the blockchain as triggered by supply chain events associated with the entity and sign the update with its cryptographically verifiable signature. In some embodiments, the updates of the supply chain events may be automatically triggered at one or more computer systems by fulfillment of conditions in a smart contract and/or based on departure or arrival scans of products by a scanning device such as a camera, an optical code (e.g., barcode, QR code) reader, a radio frequency identification tag reader, etc. Other entities may collectively verify the update requests before each update becomes a permanent part of the blockchain record. Further details of a blockchain that may be used with the systems and methods described herein are described with reference to FIGS. 5-10.

The system 100 includes a control circuit 108 that is configured to execute a data compression module and to perform certain operations. In this context, the term control circuit 108 refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein.

As shown in FIG. 1, the control circuit 108 is coupled to a memory 110 and to a network interface 112 and wireless network(s) 114. The memory 110 can, for example, store non-transitorily computer instructions that cause the control circuit 108 to operate as described herein, when the instructions are executed, as is well known in the art. Further, the network interface 112 may enable the control circuit 108 to communicate with other elements (both internal and external to the system 100). This network interface 112 is well understood in the art. The network interface 112 can communicatively couple the control circuit 108 to the wireless network 114 and whatever other networks 114 may be appropriate for the circumstances. The control circuit 108 may make use of cloud databases and/or operate in conjunction with a cloud computing platform. As can be seen, the control circuit 108 may be coupled to one or more databases (such as contract database 102, purchase order database 104, and/or database 105).

While one control circuit 108 is shown, in some forms, the functionalities of the control circuit 108 may be implemented on a plurality of processor devices communicating on a network 114. In some forms, the control circuit 108 may be coupled to a plurality of interface devices 116 and simultaneously respond to any number of queries from one or more user interface devices 116.

The control circuit 108 receives a data set of data-to-be-compressed from the database 105. It is generally contemplated that the data set may be a large data set of raw data, such as, for example, a temporal series of measurements (such as temperature measurements). The raw data may undergo initial data ingestion processing that filters out certain data components and/or converts the raw data to some standardized format.

The control circuit 108 transforms and stores the data set into a file format of rows and columns in which data of the data set are stored in a columnar fashion. In one form, the control circuit 108 transforms and stores the data of the data set in a parquet file format, which is a binary format that is generally more compressed than other non-binary formats. Parquet is a tabular file format with columns and rows that is generally usable by multiple parties and is technologically agnostic. Data are stored in a columnar fashion in which data are stored by columns instead of rows. Parquet files can generally be stored in any of various file systems for analytics processing. It should be understood that other tabular file formats may also be used.

In one aspect, it has been found that parquet is desirable as a very compressible file format. In addition to compressibility, a parquet format provides other advantages, such as querying and nesting. Its columnar file format speeds up data queries. It also includes a nesting feature that allows the overlay of data. For example, for a certain date range of data (such as January 1 to January 31), a user may want to overlay additional, nested data, such as, for example, the location of the carrier. These additional data may then later be displayed in a graph shown to the carrier.

The control circuit 108 then applies a first compression step to compress each row and write each compressed row into the file format. In one form, the control circuit 108 is configured to use a Snappy compression algorithm in the first compression step to compress each row and write each compressed row into the parquet file format. It is used to compress each row and then row-by-row write each compressed row into the parquet file, so it is performed a number of times for each parquet file. Generally, Snappy compression algorithms provide fast data compression of the rows in the parquet file. It is especially suited for compressing numerical data, such as, for example, data points of time-series data. It should be understood that other algorithms may be used to achieve the first compression step of compressing each row.

Next, the control circuit 108 applies a second compression step to further compress data after the compressed rows have been written into the file format. In one form, the control circuit 108 is configured to use a gzip algorithm in the second compression step to further compress data in the parquet file format. Once the parquet file is created and all of the data has been written, then a second compression step is applied at the file level. In one form, it is generally contemplated that the first compression step is generally compressing only the data being written in the rows; it is not compressing metadata. In contrast, in one form, it is generally contemplated that the second compression step, such as using a gzip algorithm, is compressing the metadata and the schema and structure of the file. It is generally contemplated that this second data compression step is performed one time per file. Thus, data compression occurs at two levels: compressing rows of the parquet file and then further compressing after the file has been written. It should be understood that other algorithms may be used to achieve the second compression step.

The control circuit 108 then encodes the compressed data and transmits the encoded data to a first node of the distributed ledger 106. In one form, the control circuit 108 is configured to encode the compressed data by creating a base64 string encoding of the data in the parquet file format. Base64 encoding is a binary-to-text encoding scheme. In other words, it is generally designed to convert data stored in a binary format to a channel (such as blockchain) that supports text content. In order to add the file to blockchain, the control circuit 108 encodes the files so that it can be loaded into blockchain. This is not a compression step.

In some alternative forms, it is contemplated that the encoded parquet file could be stored in cloud storage. From that cloud storage location, it could then be inserted into the blockchain (such as, for example, via a link inserted into the blockchain). However, in this case, since the encoded parquet file exists outside of the block, i.e., in the cloud, one would need to ensure that the cloud storage has same level of security as the blockchain.

In some forms, it is contemplated that the encoded data may be shared between multiple parties via the distributed ledger. For example, the control circuit 108 may be configured to share the encoded data, via the first node of the distributed ledger 106 and the network interface 112, with a second node of the distributed ledger 106. It is generally contemplated that the first and second nodes correspond to a first entity and to a second entity, respectively. For instance, the first entity may be a purchaser of products and the second entity may be a carrier of the products, who may be transporting the products on behalf of the purchaser.

In some forms, after the encoded data has been shared with the second node, the encoded data must be decoded and decompressed. For example, the control circuit 108 may decode the encoded data into the file format in which the data are stored in a columnar fashion; apply a first decompression step to unzip the decoded data; and apply a second decompression step to transform the unzipped data to correspond to the received data set. In some forms, the first entity may provide the second entity with an application or software tool that facilitates this decoding and decompression. The application or software tool may constitute a component of the control circuit 108.

In some forms, this compression and decompression of large data sets may be used to present proof or evidentiary support for a claim. For example, a purchaser of products may be interested in pursuing a claim (or request an adjustment to an invoice) where the large data set indicates a deviation from agreed-upon conditions of transport of the goods, such as not maintaining certain goods at requisite temperatures. Accordingly, the control circuit 108 may be configured to: compare data in the data set to a predetermined threshold corresponding to a characteristic of products transported by the carrier on behalf of the purchaser; determine that at least a portion of the data exceeds the predetermined threshold; and transmit a claim communication from the first entity to the second entity regarding the products transported by the carrier.

In some forms, the data may be presented/displayed in the form of a graph for ease and convenience of understanding the data. The data points may be displayed on a graph that can be scaled and magnified. In one form, the graph may be created, for example, using scalable vector graphics (SVG) to create an image.

Figure 2:
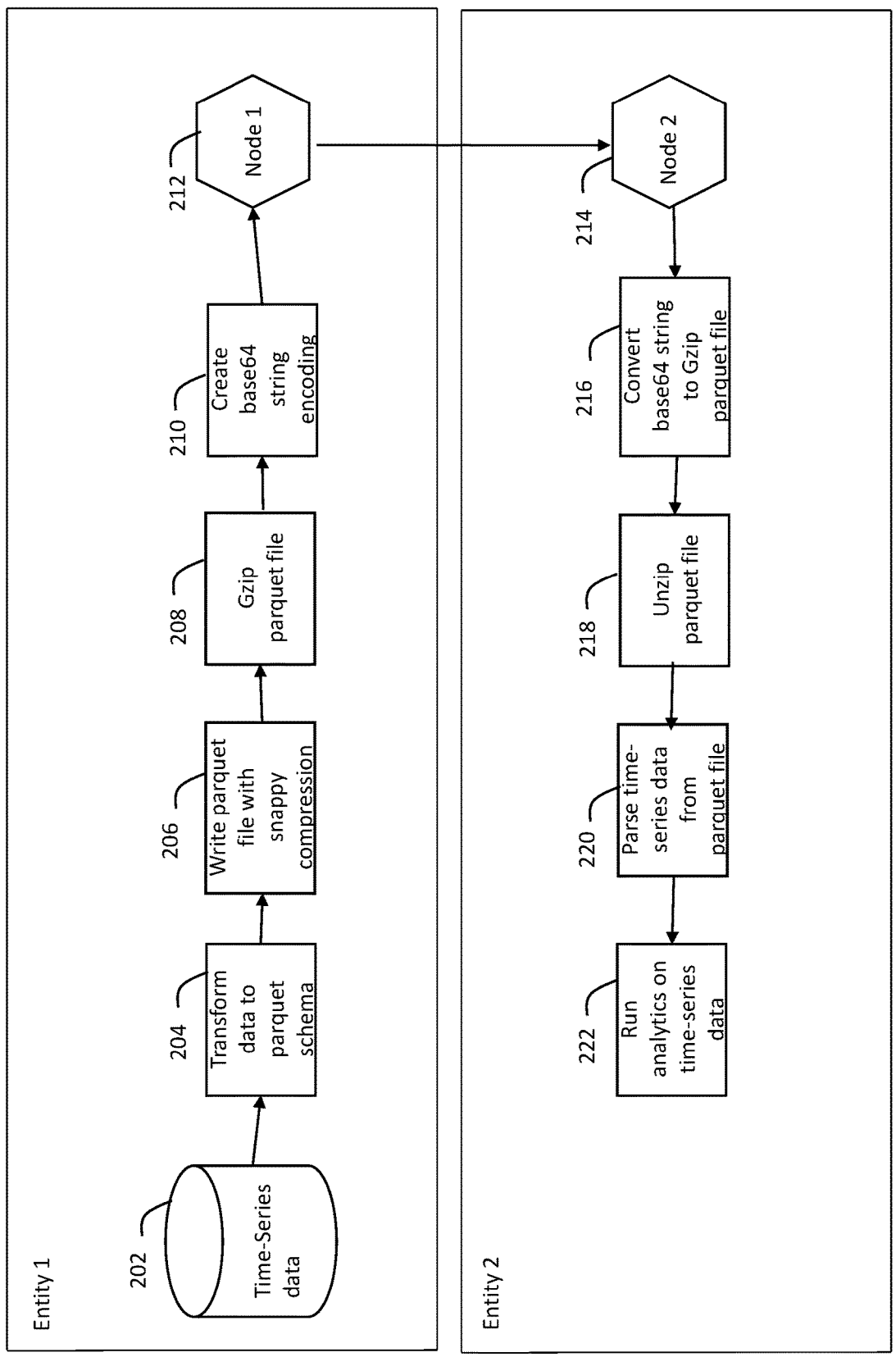
FIG. 2 comprises a flow diagram in accordance with some embodiments.

Referring to FIG. 2, there is shown a workflow or process 200 for sharing large data sets between Entity 1 and Entity 2 via a distributed ledger. The process 200 shows operations and actions to compress a large data set for the distributed ledger and then to decompress the large data set for use by Entity 2. It is generally contemplated that the design is built on a private-permission distributed ledger/blockchain framework. The process 200 may incorporate some or all of the components and operations addressed above with respect to system 100.

The large data set is stored in database 202 maintained by Entity 1. It is generally contemplated that this large data set has been received from some external source and may have been ingested and processed in some manner for the computer systems of Entity 1. In this example, the large data set is in the form of time-series (TS) data. In one form, the time-series data may correspond to temporal measurements, such as temperature measurements taken of perishable goods at certain time intervals. These temperature measurements may be taken of goods in numerous containers being transported by a carrier. In this example, Entity 1 may be the purchaser of goods for transport by Entity 2 (the carrier).

Next, in this form, at block 204, the time-series data are transformed to a parquet schema. The parquet format is generally a tabular format with rows and columns of data. At block 204, the structure of the parquet file is created, including creating headers, column names, column types, etc. Then, at block 206, the rows of the parquet file are each compressed using a Snappy compression algorithm and written into the file. This data compression is the first compression step. After this Snappy compression, the parquet file undergoes a second compression step, at block 208, by application of a gzip algorithm. At this point, the compression has been completed. At block 210, the parquet file is encoded for storage in the distributed ledger/blockchain by creating a base64 string encoding of the parquet file. At block 212, the encoded parquet file has been stored at Node 1 of the distributed ledger/blockchain, which is maintained and controlled by Entity 1.

In this example, it has been found the transactional payload of time-series data may be reduced from several megabytes (such as 3 MB) to less than one megabyte (such as 25 KB). Thus, it has been found that the transactional payload may be reduced more than 100 times per container per trip via the compressed parquet file. In another example, 1 MB may be compressed down to about 15 KB, and it is generally desirable to compress the data to less than 1 MB. This data compression makes the time-series data much more suitable for storage and use in a blockchain.

As can be seen, at block 214, the compressed data has been shared by Node 1 of Entity 1 with Node 2 of Entity 2. The compressed data can be decompressed to a more usable form by generally reversing the steps indicated above. At block 216, the parquet file is decoded by converting the base64 string to the gzipped parquet file. At block 218, the parquet file is unzipped (first decompression step). At block 220, the time-series data are parsed from the parquet file (second decompression step). At block 222, Entity 2 can now perform analytics on the time-series data. In this example, the time-series data corresponds to temperature measurements, and, at block 222, Entity 2 may analyze the data to confirm that it exceeds a temperature threshold for perishable goods.

Figure 3:
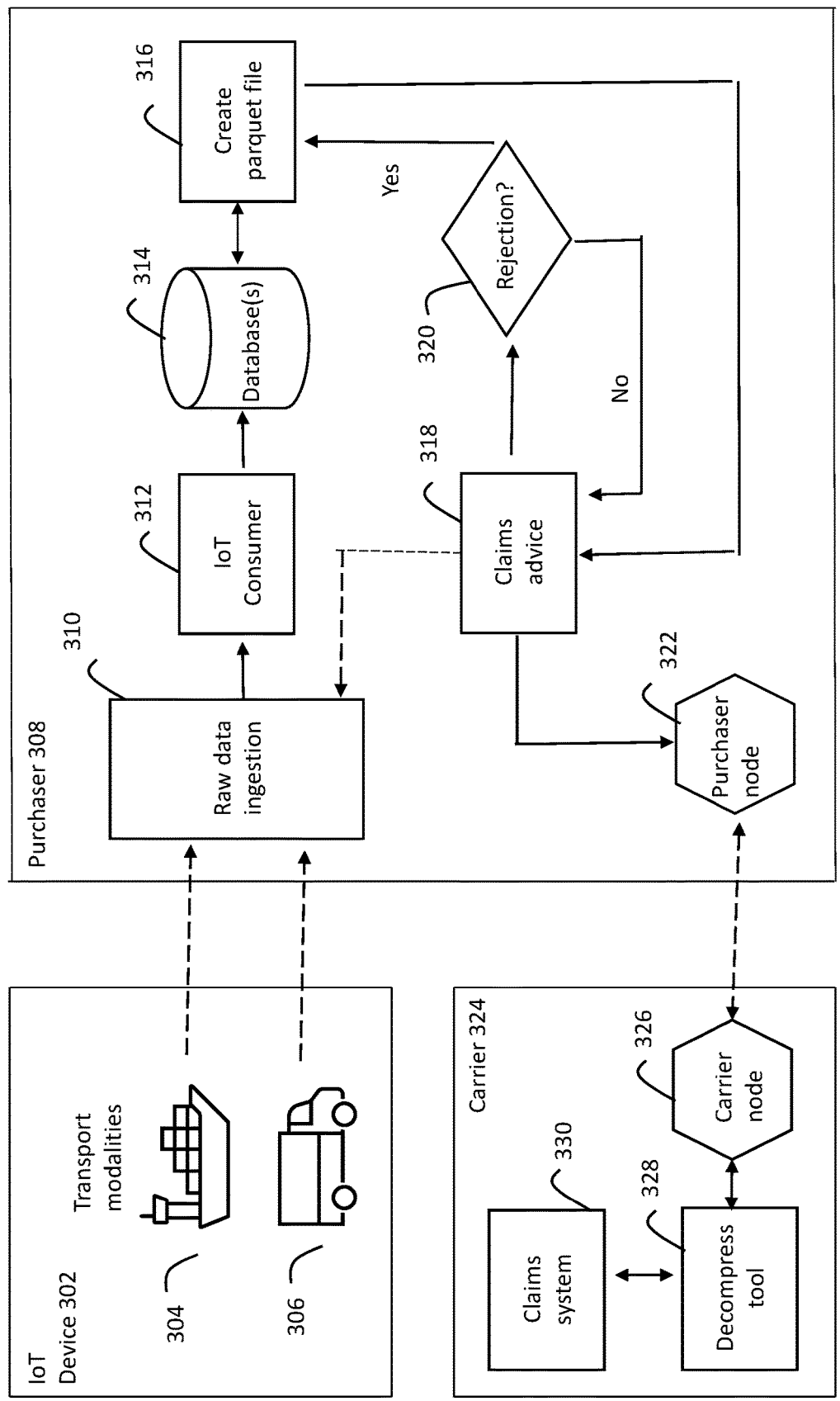
FIG. 3 comprises a schematic diagram in accordance with some embodiments.

Referring to FIG. 3, there is shown a schematic diagram of an exemplary architecture and workflow of a system 300. FIG. 3 shows an external source for the large data set that will need to be compressed for the distributed ledger/blockchain. In this example, it is contemplated that the external source is an Internet of Things (IOT) device 302 relating to transportation modalities. FIG. 3 shows transportation modalities in the form of ships 304 and/or trucks 306, although it is contemplated that other transportation modalities (such as planes) may be transporting goods yielding large data sets. The system 300 may incorporate some or all of the components and operations addressed above with respect to system 100 and process 200.

FIG. 3 also shows a purchaser's network 308. The purchaser's network 308 includes a data ingestion module 310, which receives data from the IoT device 302. It is also contemplated that various intake process may be performed at the data ingestion module 310 to make the incoming data suitable for use in the purchaser's network 308, such as, for example, filtering out certain data components and standardizing certain data formats. An application programming interface (API) may be used to facilitate communication between the IoT device 302 and the IoT consumer 312 at the purchaser's network 308. The API may be used to source (input) the data and serves as a security layer. The data can be pushed to the purchaser's network 308, or the purchaser's network can pull the data from the IoT device 302. Following this data ingestion/intake, the incoming large data set is stored at database 314. The IoT consumer 312 may aggregate data, format, and store it in database 314.

Next, in this example, data in the form of IoT readings per container are retrieved, and a parquet file is created at block 316. In one form, the IoT readings per container are periodic temperature measurements taken of perishable goods held in each container. At claims advice block 318, it is determined whether the IoT readings per container are acceptable, such as, for example, determining whether periodic temperature measurements remain below a certain temperature threshold. If some of the IoT readings are not acceptable, then a claim will be communicated to the carrier. For example, if some of the periodic temperature measurements exceed the temperature threshold, a claim will be made. If some of the data is incomplete, corrupted, or not received, the claims advice block 318 may communicate with IoT device 302 via the data ingestion module 310 to request or obtain additional data.

At block 320, the system 300 determines if there is a rejection. If no rejection, the workflow will return to block 320. If there is a rejection, the workflow returns to block 316. The parquet file that is the subject of the rejection is communicated to claims advice block 318 where it is, in turn, communicated to the purchaser's node 322 of the distributed ledger. In this manner, only the data showing rejections (unacceptable IoT readings) and supporting a claim are transmitted to the purchaser's node 322. So, in this form, the data are only attached as proof and transmitted if there is a reason for a rejection.

It is generally contemplated that the compression and encoding steps may be performed at different points in this workflow. The compression steps may be performed when the parquet file is initially created, or they may be performed only after it is determined that there is a rejection requiring that the parquet file be transmitted to the distributed ledger. Similarly, the encoding step may be performed immediately upon creation of the parquet file, or it may be performed only after a rejection is determined. In some forms, it may be determined that resources can be conserved by performing the compression and encoding steps only when necessary, i.e., only after it is determined that there is a rejection requiring that the parquet file be transmitted to the distributed ledger.

FIG. 3 also shows a carrier network 324. The carrier network 324 includes a carrier's node 326 of the distributed ledger/blockchain, and data may be shared between the purchaser's node 322 and carrier's node 326 of the distributed ledger/blockchain. It is generally contemplated that the purchaser's node 322 will share the compressed and encoded data supporting a claim. The compressed and encoded data constitutes proof/evidentiary support for the claim.

It is also contemplated that the carrier network 324 may include a decompression application or tool 328 that will facilitate both decompression and decoding of the received data. This decompression and decoding will convert the data into a form usable by the carrier. This converted data is communicated to the claims system 330 of the carrier network 324 where it can be analyzed and evaluated. This tool 328 may also plot a graph from the data points, such as for example, using SVG, and may be dynamic and interactive to allow a user to zoom and hover over data points. Alternatively, instead of being part of tool 328, a separate plug-in may be provided and/or may be used by the carrier, such as part of the claims system 330 analysis. By generating a graph from the data points at the back end (as part of the carrier network 324), the data in the graph can be accessed in a more granular way, and the graph can be made more user friendly (scalable, capable of magnification, interactive, etc.).

In an alternative form, it is contemplated that images (such as graphs) may be compressed and recorded on blockchain. As used herein, images generally refer to graphs, data representations, or other sorts of visual representations. In this way, the approach may make use of image compression and may make use of vectorized non-fungible token (NFT) images. For example, this approach may make use of image compression and vectorized NFT images representing time series data, such as, for example, graphs/data representations of temperature measurements of perishable merchandise. In this alternative form, images may be compressed, recorded and shared on blockchain, and then decompressed, such as by a carrier. For instance, this approach might include a system for compressing data for use in a distributed ledger, the system comprising: a network interface; a user interface device; and a control circuit coupled to the network interface and the user interface device. In this alternative form, the control circuit may execute a data compression module configured to: receive, via the network interface, a data set; compress an image or vectorized NFT image representing the data set; and record the compressed image or vectorized NFT image representing the data set to a first node of the distributed ledger. The compressed image or vectorized NFT image may be shared with a second node of the distributed ledger and may then be decompressed. This alternative approach may incorporate some or all of the components and operations addressed above with respect to systems and processes 100, 200, and 300, including making use of the file formats and/or the compression steps addressed above. However, this alternative form may provide less flexibility regarding manipulation of the images (such as graphs) at the back end, such as by a carrier. The graphs may not be scalable, capable of magnification, interactive, etc.

Figure 4:
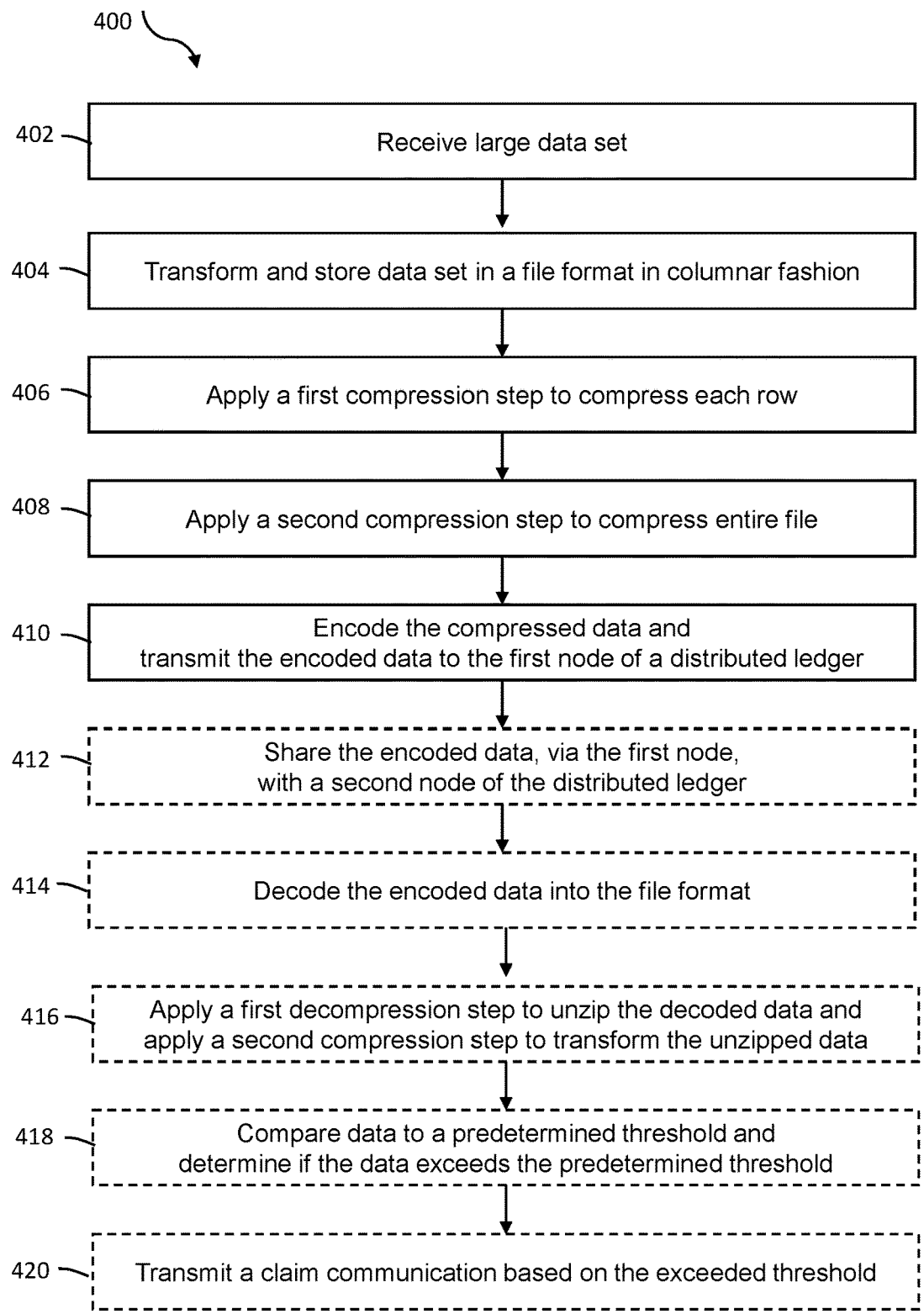
FIG. 4 comprises a flow diagram in accordance with some embodiments.

FIG. 4 shows a process 400 for compressing data for use in a distributed ledger. In some forms, it is contemplated that the process 400 involves a purchaser of goods (a first entity) and a carrier of the goods (a second entity). In some forms, it is contemplated that, during the transport of the goods, the transport may experience events that affect the goods and that may support a claim by the purchaser. The process 400 may incorporate some or all of the components and operations addressed above with respect to systems and processes 100, 200, and 300.

At block 402, a large data set is received. For example, the large data set may be received at a data ingestion/intake module of a purchaser's network where it may be initially processed for use in the purchaser's network. The large data set may be communicated to the purchaser's network from a transportation modality operated by the carrier, such as ships, trucks, or planes. As one example, the large data set may constitute a series of temperature measures of perishable goods within a container being transported by the carrier.

At block 404, the data set is transformed and stored in a file format in columnar fashion. In one form, the data set is transformed and stored in a parquet file format. At block 406, a first compression step is applied to compress each row and write each compressed row into the file format. In one form, a Snappy compression algorithm is used to compress each row and write each compressed row into the parquet file format. At block 408, a second compression step is applied to further compress data after all of the compressed rows have been written into the file format. In one form a gzip algorithm is used. At block 410, the compressed data is encoded for use in a distributed ledger, and the encoded data is transmitted to the first node of a distributed ledger. In one form a base64 string encoding of the data is created.

At block 412, the encoded data may be shared between multiple parties via the distributed ledger. More specifically, the encoded data may be shared, via the first node, with a second node of the distributed ledger. In this form, the first and second nodes may correspond to a purchaser node (first entity) and to a carrier node (second entity), respectively.

After the encoded data has been shared with the second node, the encoded data may be decoded and decompressed. At block 414, the encoded data may be decoded into the file format in which the data are stored in a columnar fashion. At block 416, a first decompression step is applied to unzip the decoded data, and a second decompression step is applied to transform the unzipped data to correspond to the received data set.

Blocks 418 and 420 address one exemplary use of the data. At block 418, the data is compared to a predetermined threshold, and it is determined whether the data (or a portion thereof) exceed the predetermined threshold. In the example addressed earlier, the data may be in the form of a series of temperature measurements of goods in a container being transported by the carrier. In this example, it is determined whether some of the temperature measurements exceed a certain temperature threshold. At block 420, a claim communication is transmitted based on the exceeded threshold. In the above example, a claim communication may be transmitted from the purchaser to the carrier indicating that the temperature threshold was exceeded for goods in a container. Support in the form of a series of temperature measurements may be transmitted to the carrier via the blockchain. In some instances, it is contemplated that the series of temperature measurements may be displayed in a graph form (such as a scalable vector graphics (SVG) form) for ease of seeing when the temperature threshold was exceeded.

Descriptions of some embodiments of blockchain technology are provided with reference to FIG. 5-10 herein. In some embodiments of the invention described above, blockchain technology may be utilized to record supply chain events and supply information for product certificate management. One or more of the systems associated with supply chain entities described herein may comprise a node in a distributed blockchain system storing a copy of the blockchain record. Updates to the blockchain may comprise supply chain events such as transfer of items from one supply chain entity to another and/or the processing of a product from one form to another (e.g., cases of tomato to salad kit) and one or more nodes on the system may be configured to incorporate one or more updates into blocks to add to the distributed database.

Distributed databases and shared ledger databases generally refer to databases based on peer-to-peer record-keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g., proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin.pdf), the entirety of which is incorporated herein by reference.

Figure 5:
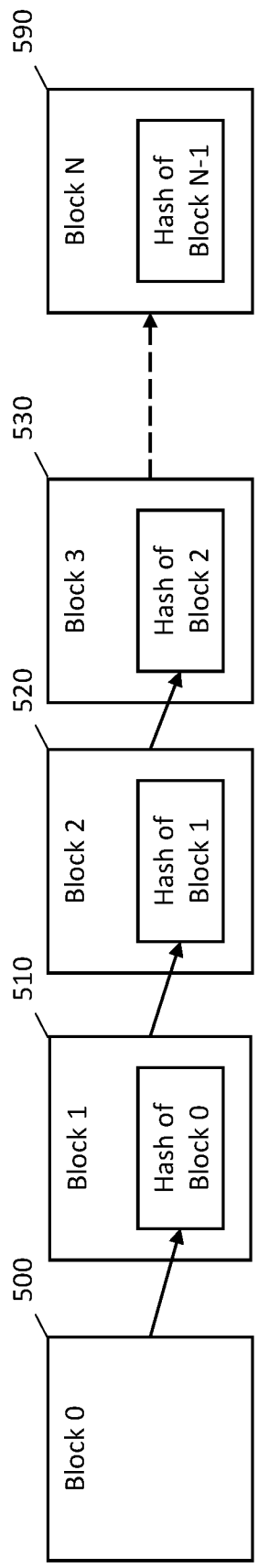
FIG. 5 comprises an illustration of blocks of a distributed ledger as configured in accordance with some embodiments.

Now referring to FIG. 5, an illustration of a blockchain according to some embodiments is shown. In some embodiments, a blockchain comprises a hash chain or a hash tree in which each block added in the chain contains a hash of the previous block. In FIG. 5, block 0 500 represents a genesis block of the chain. Block 1 510 contains a hash of block 0 500, block 2 520 contains a hash of block 1 510, block 3 530 contains a hash of block 2 520, and so forth. Continuing down the chain, block N 590 contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g., proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the blockchain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain.

For example, in the Bitcoin system, "miners" are nodes that compete to provide proof-of-work to form a new block, and the first successful miner of a new block earns Bitcoin currency in return.

Figure 6:
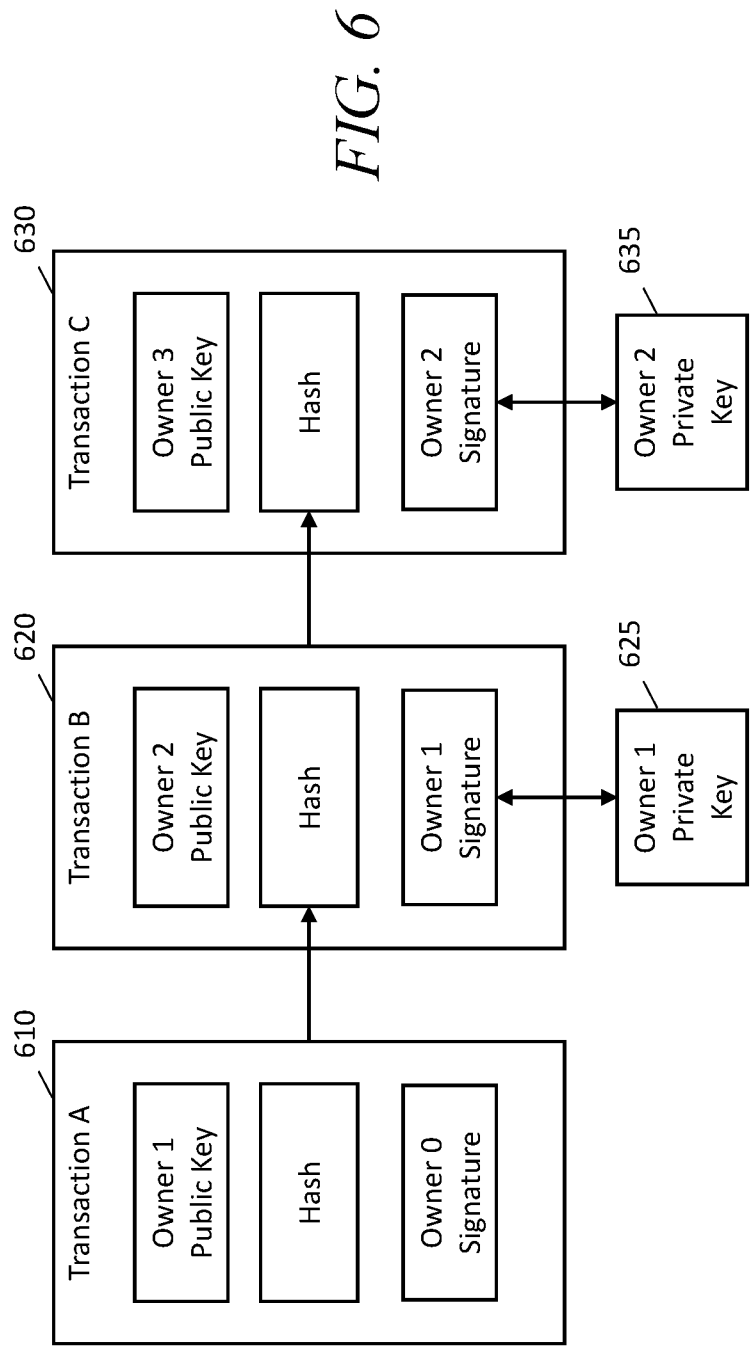
FIG. 6 comprises an illustration of transaction records configured in accordance with some embodiments.

Now referring to FIG. 6, an illustration of blockchain-based transactions according to some embodiments is shown. In some embodiments, the blockchain illustrated in FIG. 6 comprises a hash chain protected by private/public key encryption. Transaction A 610 represents a transaction recorded in a block of a blockchain showing that owner 1 (recipient) obtained an asset from owner 0 (sender). Transaction A 610 contains owner's 1 public key and owner 0's signature for the transaction and a hash of a previous block. When owner 1 transfers the asset to owner 2, a block containing transaction B 620 is formed. The record of transaction B 620 comprises the public key of owner 2 (recipient), a hash of the previous block, and owner 1's signature for the transaction that is signed with the owner 1's private key 625 and verified using owner 1's public key in transaction A 610. When owner 2 transfers the asset to owner 3, a block containing transaction C 630 is formed. The record of transaction C 630 comprises the public key of owner 3 (recipient), a hash of the previous block, and owner 2's signature for the transaction that is signed by owner 2's private key 635 and verified using owner 2's public key from transaction B 620. In some embodiments, when each transaction record is created, the system may check previous transaction records and the current owner's private and public key signature to determine whether the transaction is valid. In some embodiments, transactions may be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double-spending the asset. The transactions in FIG. 6 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 7:
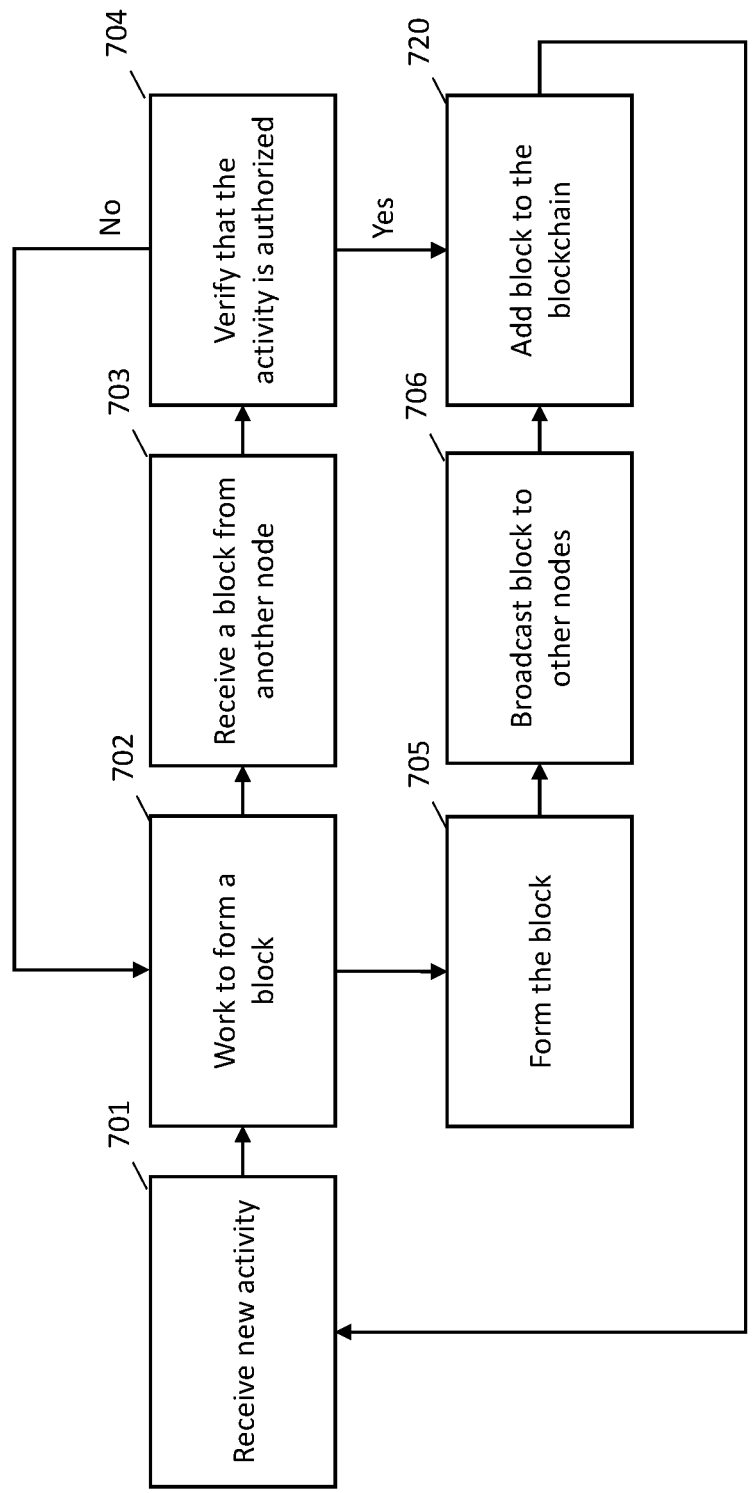
FIG. 7 comprises a flow diagram in accordance with some embodiments.

Now referring to FIG. 7, a flow diagram according to some embodiments is shown. In some embodiments, the steps shown in FIG. 7 may be performed by a processor-based device, such as a computer system, a server, a distributed server, a timestamp server, a blockchain node, and the like. In some embodiments, the steps in FIG. 7 may be performed by one or more of the nodes in a system using blockchain for record-keeping.

In step 701, a node receives a new activity. The new activity may comprise an update to the record being kept in the form of a blockchain. In some embodiments, for blockchain-supported digital or physical asset record-keeping, the new activity may comprise an asset transaction. In some embodiments, the new activity may be broadcasted to a plurality of nodes on the network prior to step 701. In step 702, the node works to form a block to update the blockchain. In some embodiments, a block may comprise a plurality of activities or updates and a hash of one or more previous blocks in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g., proof of work, proof of stake, etc.) which requires the node to solve a difficult mathematical problem to form a nonce in order to form a block. In some embodiments, the node may be configured to verify that the activity is authorized prior to working to form the block. In some embodiments, whether the activity is authorized may be determined based on records in the earlier blocks of the blockchain itself.

After step 702, if the node successfully forms a block in step 705 prior to receiving a block from another node, the node broadcasts the block to other nodes over the network in step 706. In some embodiments, in a system with incentive features, the first node to form a block may be permitted to add incentive payment to itself in the newly formed block. In step 720, the node then adds the block to its copy of the blockchain. In the event that the node receives a block formed by another node in step 703 prior to being able to form the block, the node works to verify that the activity recorded in the received block is authorized in step 704. In some embodiments, the node may further check the new block against system consensus rules for blocks and activities to verify whether the block is properly formed. If the new block is not authorized, the node may reject the block update and return to step 702 to continue to work to form the block. If the new block is verified by the node, the node may express its approval by adding the received block to its copy of the blockchain in step 720. After a block is added, the node then returns to step 701 to form the next block using the newly extended blockchain for the hash in the new block.

In some embodiments, in the event one or more blocks having the same block number is received after step 720, the node may verify the later arriving blocks and temporarily store these blocks if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 701.

Figure 8:
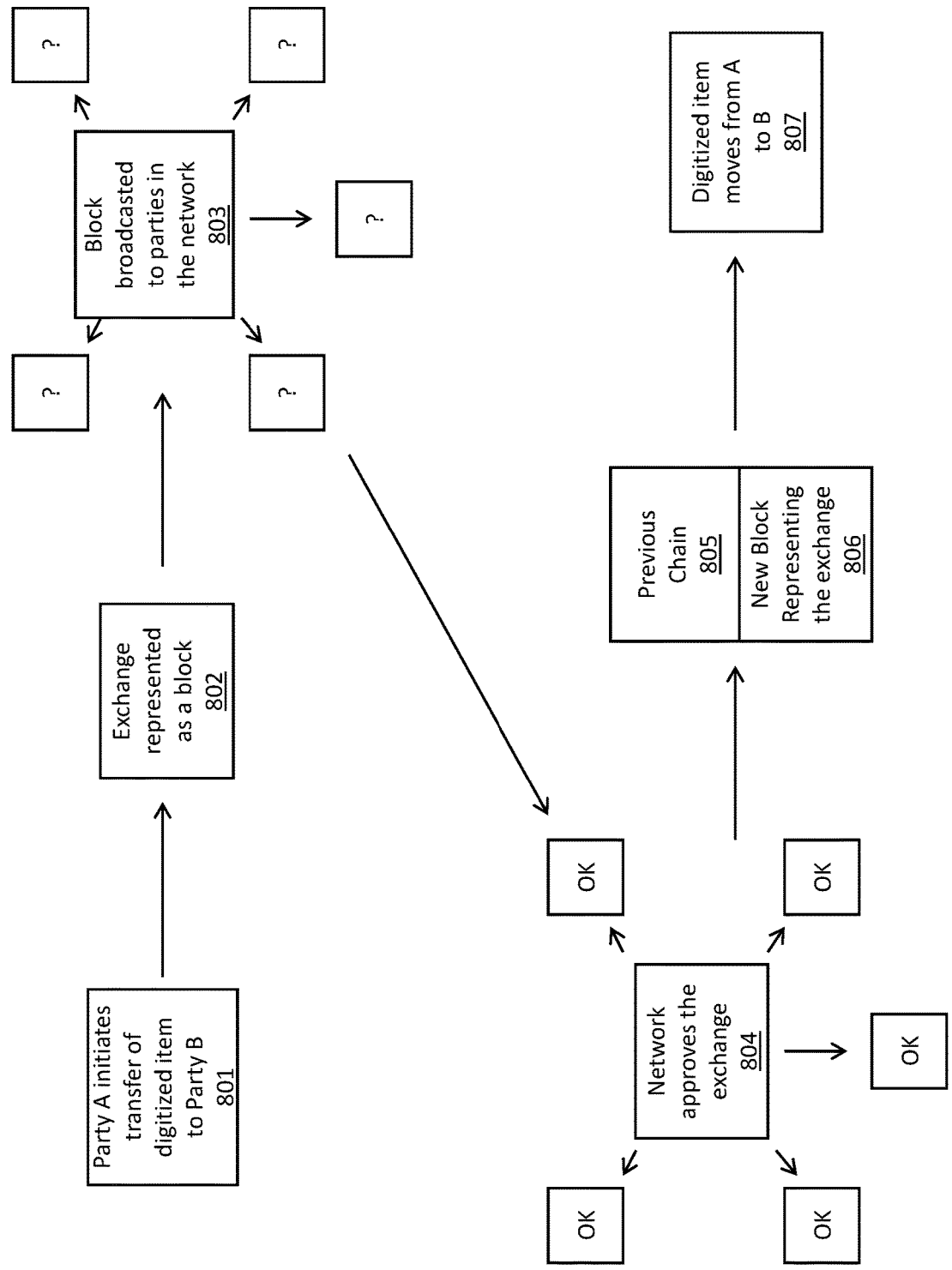
FIG. 8 comprises a process diagram as configured in accordance with some embodiments.

Now referring to FIG. 8, a process diagram of a blockchain update according to some implementations is shown. In step 801, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 802, the exchange initiated in step 801 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide proof of work for a block may earn a Bitcoin. In some embodiments, a block may comprise one or more transactions between different parties that are broadcasted to the nodes. In step 803, the block is broadcasted to parties in the network. In step 804, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g., party A is in possession of the asset he/she s seeks to transfer). In some embodiments, a block may be approved with consensus of the nodes in the network. After a block is approved, the new block 806 representing the exchange is added to the existing chain 805 comprising blocks that chronologically precede the new block 806. The new block 806 may contain the transaction(s) and a hash of one or more blocks in the existing chain 805. In some embodiments, each node may then update their copy of the blockchain with the new block and continue to work on extending the chain with additional transactions. In step 807, when the chain is updated with the new block, the digitized item is moved from party A to party B.

Figure 9:
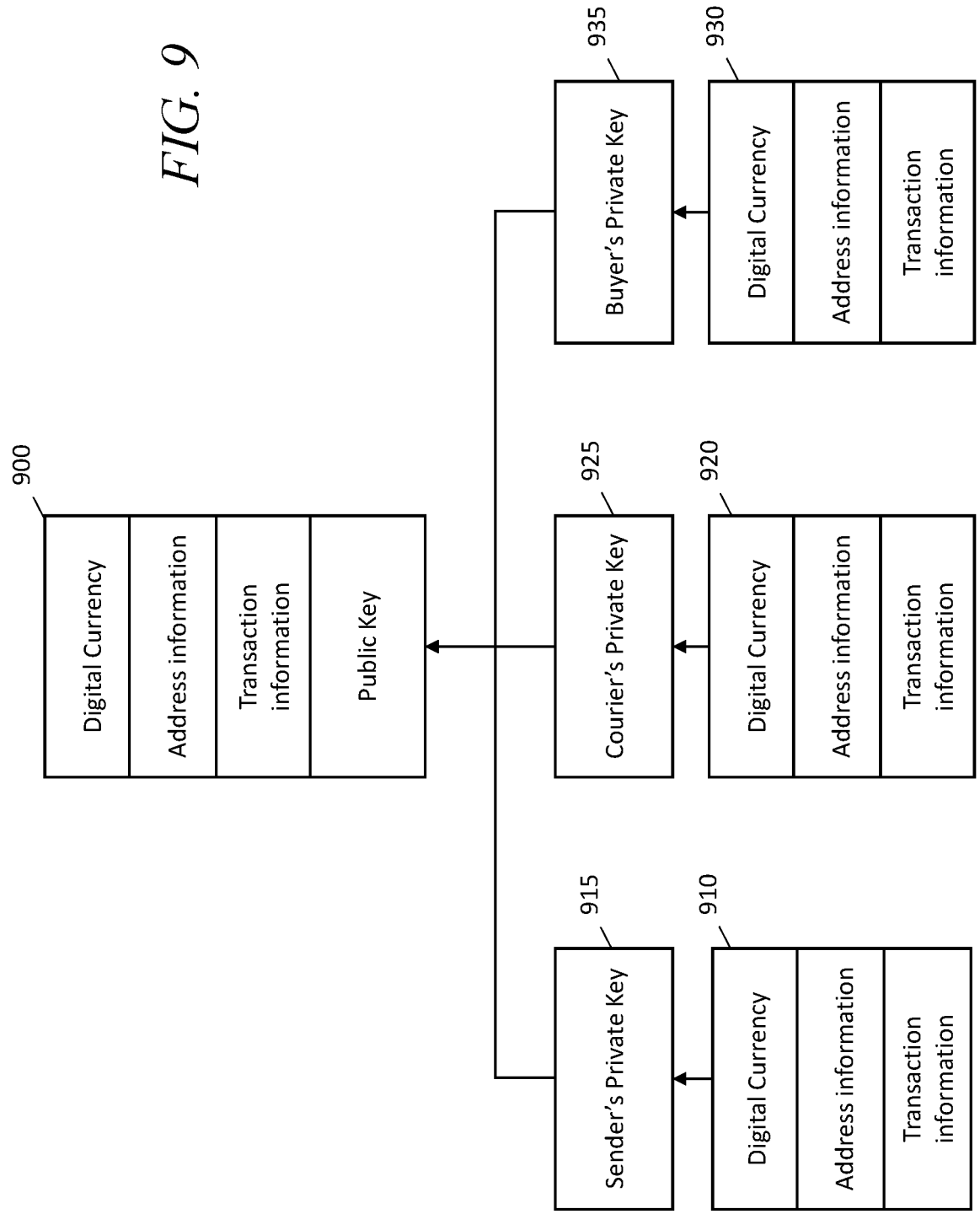
FIG. 9 comprises an illustration of a delivery record configured in accordance with some embodiments.

Now referring to FIG. 9, a diagram of a blockchain according to some embodiments in shown. FIG. 9 comprises an example of an implementation of a blockchain system for delivery service record keeping. The delivery record 900 comprises digital currency information, address information, transaction information, and a public key associated with one or more of a sender, a courier, and a buyer. In some embodiments, nodes associated with the sender, the courier, and the buyer may each store a copy of the delivery records 910, 920, and 930 respectively. In some embodiments, the delivery record 900 comprises a public key that allows the sender, the courier, and/or the buyer to view and/or update the delivery record 900 using their private keys 915, 925, and 935 respectively. For example, when a package is transferred from a sender to the courier, the sender may use the sender's private key 915 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 925 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 9, the delivery record may be updated by one or more of the sender, courier, and the buyer to form a record of the transaction without a trusted third party while preventing unauthorized modifications to the record. In some embodiments, the blockchain-based transactions may further function to include transfers of digital currency with the completion of the transfer of physical assets. With the distributed database and peer-to-peer verification of a blockchain system, the sender, the courier, and the buyer can each have confidence in the authenticity and accuracy of the delivery record stored in the form of a blockchain.

Figure 10:
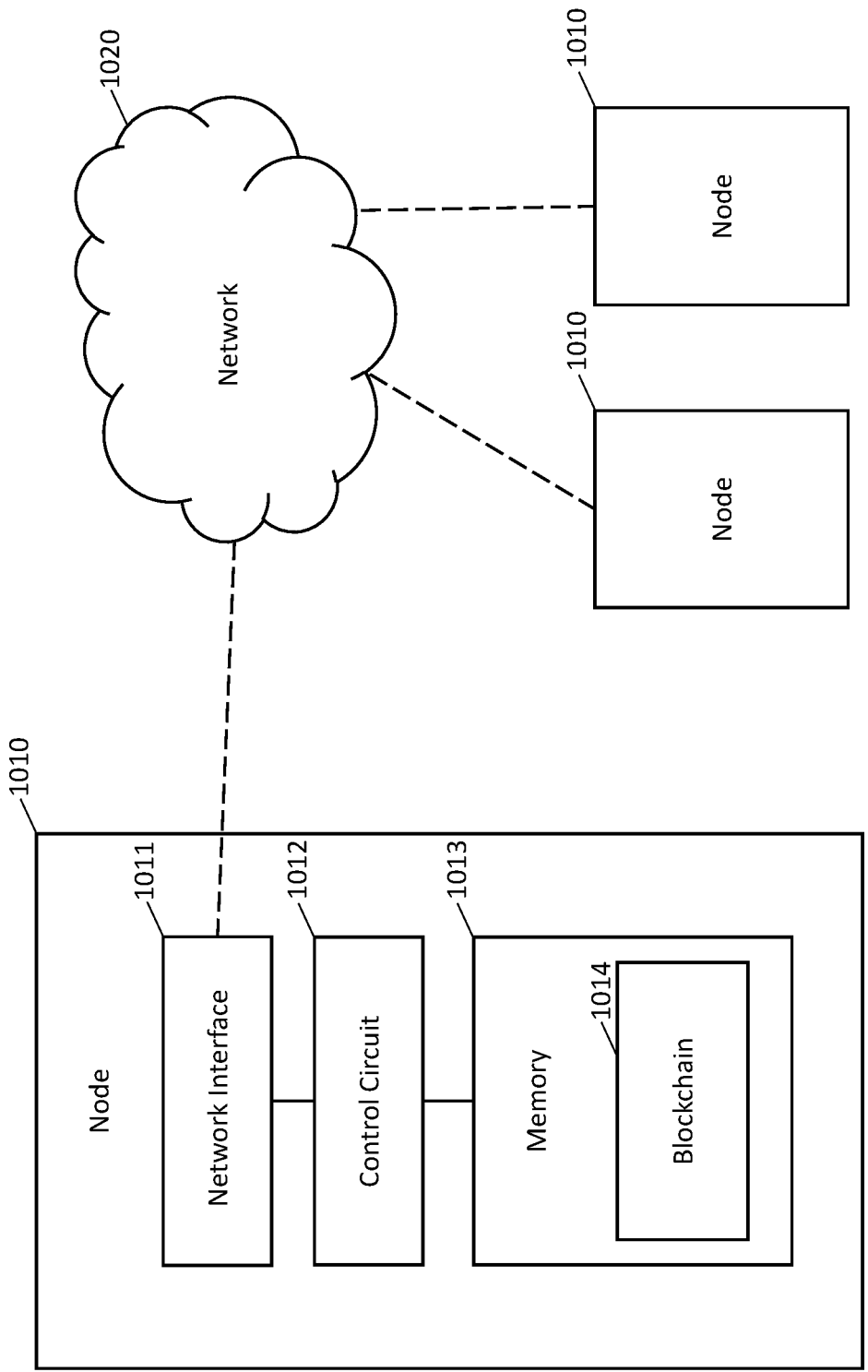
FIG. 10 comprises a system diagram configured in accordance with some embodiments.

Now referring to FIG. 10, a system according to some embodiments is shown. A distributed blockchain system comprises a plurality of nodes 1010 communicating over a network 1020. In some embodiments, the nodes 1010 may comprise a distributed blockchain server and/or a distributed timestamp server. In some embodiments, one or more nodes 1010 may comprise or be similar to a "miner" device on the Bitcoin network. Each node 1010 in the system comprises a network interface 1011, a control circuit 1012, and a memory 1013.

The control circuit 1012 may comprise a processor, a microprocessor, and the like and may be configured to execute computer readable instructions stored on a computer readable storage memory 1013. The computer readable storage memory may comprise volatile and/or non-volatile memory and have stored upon it a set of computer readable instructions which, when executed by the control circuit 1012, causes the node 1010 to update the blockchain 1014 stored in the memory 1013 based on communications with other nodes 1010 over the network 1020. In some embodiments, the control circuit 1012 may further be configured to extend the blockchain 1014 by processing updates to form new blocks for the blockchain 1014. Generally, each node may store a version of the blockchain 1014, and together, may form a distributed database. In some embodiments, each node 1010 may be configured to perform one or more steps described herein.

The network interface 1011 may comprise one or more network devices configured to allow the control circuit to receive and transmit information via the network 1020. In some embodiments, the network interface 1011 may comprise one or more of a network adapter, a modem, a router, a data port, a transceiver, and the like. The network 1020 may comprise a communication network configured to allow one or more nodes 1010 to exchange data. In some embodiments, the network 1020 may comprise one or more of the Internet, a local area network, a private network, a virtual private network, a home network, a wired network, a wireless network, and the like. In some embodiments, the system does not include a central server and/or a trusted third-party system. Each node in the system may enter and leave the network at any time.

With the system and processes shown in, once a block is formed, the block cannot be changed without redoing the work to satisfy census rules thereby securing the block from tampering. A malicious attacker would need to provide a proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain-backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one or more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain-based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain-based system allows content use, content exchange, and the use of the content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that use one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for compressing data for use in a distributed ledger, the system comprising:
 a network interface; and
 a control circuit coupled to the network interface, the control circuit executing a data compression module configured to:
  receive, via the network interface, a data set;
  transform and store the data set into a file format of rows and columns in which data of the data set are stored in a columnar fashion;
  apply a first compression step to compress each row and write each compressed row into the file format;
  apply a second compression step to further compress data after the compressed rows have been written into the file format; and
  encode the compressed data and transmit the encoded data to a first node of a distributed ledger;
  wherein the first compression step and the second compression step apply different compression algorithms, the first compression step applying row-level compression and the second compression step applying file-level compression.

2. The system of claim 1, wherein the data set comprises a temporal series of measurements.

3. The system of claim 1, wherein the control circuit is configured to transform and store the data of the data set in a parquet file format.

4. The system of claim 3, wherein the control circuit is configured to use a Snappy compression algorithm in the first compression step to compress each row and write each compressed row into the parquet file format.

5. The system of claim 4, wherein the control circuit is configured to use a gzip algorithm in the second compression step to further compress data in the parquet file format.

6. The system of claim 5, wherein the control circuit is configured to encode the further compressed data by creating a base64 string encoding of the data in the parquet file format.

7. The system of claim 1, wherein the control circuit is configured to share the encoded data, via the first node of the distributed ledger and the network interface, with a second node of the distributed ledger, the first and second nodes corresponding to a first entity and a second entity, respectively.

8. The system of claim 7, wherein the control circuit is configured to:
 decode the encoded data into the file format in which the data are stored in a columnar fashion;
 apply a first decompression step to unzip the decoded data; and
 apply a second decompression step to transform the unzipped data to correspond to the received data set.

9. The system of claim 7, wherein the first entity is a purchaser of products and the second entity is a carrier of the products.

10. The system of claim 9, wherein the control circuit is configured to:
 compare data in the data set to a predetermined threshold corresponding to a characteristic of products transported by the carrier on behalf of the purchaser;
 determine that at least a portion of the data exceeds the predetermined threshold; and
 transmit a claim communication from the first entity to the second entity regarding the products transported by the carrier.

11. The system of claim 1, further comprising a user interface device, the control circuit coupled to the user interface device.

12. A method for compressing data for use in a distributed ledger, the method comprising:
 receiving, by a control circuit executing a data compression module, a data set via a network interface;
 transforming and storing, by the control circuit, the data set into a file format of rows and columns in which data of the data set are stored in a columnar fashion;
 applying, by the control circuit, a first compression step to compress each row and write each compressed row into the file format;
 applying, by the control circuit, a second compression step to further compress data after the compressed rows have been written into the file format; and
 encoding, by the control circuit, the compressed data and transmitting the encoded data to a first node of a distributed ledger;
 wherein the first compression step and the second compression step apply different compression algorithms, the first compression step applying row-level compression and the second compression step applying file-level compression.

13. The method of claim 12, wherein the data set comprises a temporal series of measurements.

14. The method of claim 12, further comprising, by the control circuit:
 transform and store the data of the data set in a parquet file format.

15. The method of claim 14, further comprising, by the control circuit:
 using a Snappy compression algorithm in the first compression step to compress each row and write each compressed row into the parquet file format.

16. The method of claim 15, further comprising, by the control circuit:
 using a gzip algorithm in the second compression step to further compress data in the parquet file format.

17. The method of claim 16, further comprising, by the control circuit:
 encoding the further compressed data by creating a base64 string encoding of the data in the parquet file format.

18. The method of claim 12, further comprising, by the control circuit:
 sharing the encoded data, via the first node of the distributed ledger and the network interface, with a second node of the distributed ledger, the first and second nodes corresponding to a first entity and a second entity, respectively.

19. The method of claim 18, further comprising, by the control circuit:
 decoding the encoded data into the file format in which the data are stored in a columnar fashion;
 applying a first decompression step to unzip the decoded data; and
 applying a second decompression step to transform the unzipped data to correspond to the received data set.

20. The method of claim 18, wherein the first entity is a purchaser of products and the second entity is a carrier of the products;

the method further comprising, by the control circuit:
comparing data in the data set to a predetermined threshold corresponding to a characteristic of products transported by the carrier on behalf of the purchaser;
determining that at least a portion of the data exceeds the predetermined threshold; and
transmitting a claim communication from the first entity to the second entity regarding the products transported by the carrier.

\* \* \* \* \*